United States Patent
Kurian et al.

(10) Patent No.: US 9,563,873 B1
(45) Date of Patent: *Feb. 7, 2017

(54) RESOURCE TAG GENERATION AND DEPLOYMENT FOR RESOURCE VALUATION AND DISTRIBUTION

(71) Applicant: BANK OF AMERICA CORPORATION, Charlotte, NC (US)

(72) Inventors: Manu Jacob Kurian, Dallas, TX (US); Sasidhar Purushothaman, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,191

(22) Filed: Oct. 18, 2016

Related U.S. Application Data

(63) Continuation of application No. 15/082,229, filed on Mar. 28, 2016.

(51) Int. Cl.
  *G06F 17/00* (2006.01)
  *G06Q 10/08* (2012.01)
  *G06K 17/00* (2006.01)

(52) U.S. Cl.
  CPC ......... *G06Q 10/087* (2013.01); *G06K 17/0022* (2013.01)

(58) Field of Classification Search
  CPC . G06Q 30/02; G06Q 30/0201; G06Q 30/0206
  USPC ...... 235/375, 377, 378, 383, 462.46, 472.02
  See application file for complete search history.

(56) References Cited

U.S. PATENT DOCUMENTS

| | | |
|---|---|---|
| 5,717,923 A | 2/1998 | Dedrick |
| 5,761,648 A | 6/1998 | Golden et al. |
| 5,842,185 A | 11/1998 | Chancey et al. |
| 5,848,396 A | 12/1998 | Gerace |

(Continued)

FOREIGN PATENT DOCUMENTS

| CN | 104283967 A | 1/2015 |
|---|---|---|

OTHER PUBLICATIONS

Friedman, Jack P., Dictionary of Business Terms, 2000, Barron's Educational Series, Inc., 3rd edition, 225.

(Continued)

*Primary Examiner* — Daniel St Cyr
(74) *Attorney, Agent, or Firm* — Michael A. Springs; Moore & Van Allen PLLC; Nicholas C. Russell

(57) ABSTRACT

Embodiments of the invention are directed to a system, method, or computer program product for generating resource tag systems and integration of the tag systems on machines for machine use, valuation, and distribution. The tags comprise sensors for monitoring activity of the machine or product and identifies stagnant periods in the use of the machine or product. Based on a triggering stagnant duration, the tag system provides signals to the user indicating product inactivity. The tag may generate a communicable link with outside sources to identify and present the user with a current market value of the machine or product that the tag is affixed. Upon authorization, the tag may post the machine or product for sale and/or present the product for donation. Furthermore, upon sale of the product, the tag may be able to transfer warranty information along with the product.

17 Claims, 7 Drawing Sheets

(56) References Cited

U.S. PATENT DOCUMENTS

| | | |
|---|---|---|
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,865,545 B1 | 3/2005 | Epstein et al. |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,234,194 B2 | 7/2012 | Mele et al. |
| 8,301,558 B2 | 10/2012 | Marshall et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,984,113 B2 | 3/2015 | Li et al. |
| 9,106,615 B2 | 8/2015 | Grossman |
| 2002/0032626 A1* | 3/2002 | DeWolf ............... G06Q 10/06 705/35 |
| 2002/0049624 A1 | 4/2002 | Raveis, Jr. |
| 2002/0052803 A1* | 5/2002 | Amidhozour ..... G06F 17/30259 705/14.51 |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0143564 A1 | 10/2002 | Webb et al. |
| 2002/0190118 A1 | 12/2002 | Davenport et al. |
| 2004/0122736 A1 | 6/2004 | Strock et al. |
| 2004/0226995 A1 | 11/2004 | Smith |
| 2004/0230593 A1 | 11/2004 | Rudin et al. |
| 2004/0249768 A1* | 12/2004 | Kontio ................ G06F 21/10 705/65 |
| 2005/0075975 A1 | 4/2005 | Rosner et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2007/0005426 A1 | 1/2007 | Walker et al. |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0021767 A1 | 1/2008 | Benson et al. |
| 2008/0040417 A1 | 2/2008 | Juncker |
| 2008/0091535 A1 | 4/2008 | Heiser, II et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2009/0006175 A1 | 1/2009 | Maertz |
| 2009/0043629 A1 | 2/2009 | Price |
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0274731 A1 | 10/2010 | Tsitsis |
| 2010/0306763 A1 | 12/2010 | Lambert et al. |
| 2011/0087547 A1 | 4/2011 | Amaro et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0270773 A1 | 11/2011 | Siekman et al. |
| 2012/0030092 A1 | 2/2012 | Marshall et al. |

(56) References Cited

U.S. PATENT DOCUMENTS

2014/0047322 A1 2/2014 Kim et al.
2014/0244834 A1 8/2014 Guedalia et al.

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.
International Preliminary Report on Patentability (IPRP) dated Jul. 31, 2012 for International Application No. PCT/US2011/022765.
International Search Report and the Written Opinion of the International Searching Authority mailed Mar. 25, 2011 for International Application No. PCT/US11/22781.
International Search Report and the Written Opinion of the International Searching Authority mailed Mar. 25, 2011 for International Application No. PCT/US11/22783.
International Search Report and the Written Opinion of the International Searching Authority mailed Mar. 28, 2011 for International Application No. PCT/US11/22771.
International Search Report and the Written Opinion of the International Searching Authority mailed Mar. 29, 2011 for International Application No. PCT/US11/22779.
International Search Report and the Written Opinion of the International Searching Authority mailed Mar. 29, 2011 for International Application No. PCT/US11/22785.
International Search Report and the Written Opinion of the International Searching Authority mailed Apr. 8, 2011 for International Application No. PCT/US11/22765.

* cited by examiner

RESOURCE TAG GENERATION AND DEPLOYMENT FOR RESOURCE VALUATION AND DISTRIBUTION

CROSS-REFERENCE OF RELATED APPLICATIONS

This application claims priority to U.S. patent application Ser. No. 15/082,229, filed Mar. 28, 2016, entitled "Resource Tag Generation and Deployment for Resource Valuation and Distribution," the entirety of which is incorporated herein by reference.

BACKGROUND

With advancements in machine and product development, more and more machines and products are being interconnected via internet channels. As such, diagnostics and communications with machinery, products, and the like are becoming more advanced. This allows for quick diagnostics and communications for maintenance and repair.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/ or other needs by providing an innovative system, method and computer program product for generating resource tags and integration of the tags on products for resource valuation and distribution.

In some embodiments, the invention generates tags for user implementation onto products. The implemented tag monitors the user of products and identifies a stagnant period in the use of the product. The tag provides signals to the user indicating product inactivity. The system may generate a current market value of the products. Upon authorization, the system may post the product for sale and/or present the product for donation. Furthermore, upon sale of the product, the system may be able to transfer warranty information along with the product.

Embodiments of the invention relate to systems, methods, and computer program products for a deployable valuation and distribution tag, the invention comprising: receiving an indication of deployment onto a product, wherein the indication of deployment comprises an activation of the tag; identifying the product deployed onto, wherein identifying the product comprises one or more of receiving user input identifying the product or identifying a shape of the product; generating a communicable linkage with a user device and distributor servers; identifying, during deployment, activity associated with the product and log the activity identified; generating valuation of the product by communicating the log of activity and the product identity to a valuation entity via the communicable linkage; receiving the valuation from the valuation entity, wherein the valuation is a resource amount that the valuation entity identifies and will accept distribution of the product for the resource amount; and presenting the valuation and a distribution value to a user via a display associated with the user device, wherein the distribution value comprises a resource amount an entity is offering for distribution of the product.

In some embodiments, the invention further comprises: receiving terms from the user via the user device, wherein the terms define a trigger duration of inactivity; monitoring, during deployment of the tag, inactivity of the product and log the inactivity identified; triggering valuation and distribution of product based on an identification of the duration of inactivity associated with the terms from the user; presenting the log of inactivity and the product identity to a valuation entity via the communicable linkage for valuation of the product based on the trigger; receiving the valuation from the valuation entity and distribution terms including the distribution value from the valuation entity; confirming valuation and distribution terms are acceptable by user based on received terms from the user; and completing a distribution of the product to the valuation entity.

In some embodiments, the invention further comprises generating the tag, wherein the tag is an affixable device comprising a communication linkage generator, positioning device, and gyroscopic device.

In some embodiments, identifying activity associated with the product further comprises using a gyroscopic device and positioning device associated with the tag to monitor motion and activation of the product.

In some embodiments, identifying a shape of the product further comprises scanning the product using a camera or sensor associated with the tag to identify a shape of the product and communicating the shape to the user device and distributor servers for confirmation of identification of product.

In some embodiments, distributor servers are associated with a merchant, online auction house, or manufacturer capable of valuation and purchasing of the product based on receiving the product information from the tag.

In some embodiments, the invention further comprises distributing the product to a purchaser based on user selection and approval of the distribution value, wherein distribution further comprises transferring of warranty to the purchaser.

In some embodiments, the product is a machine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
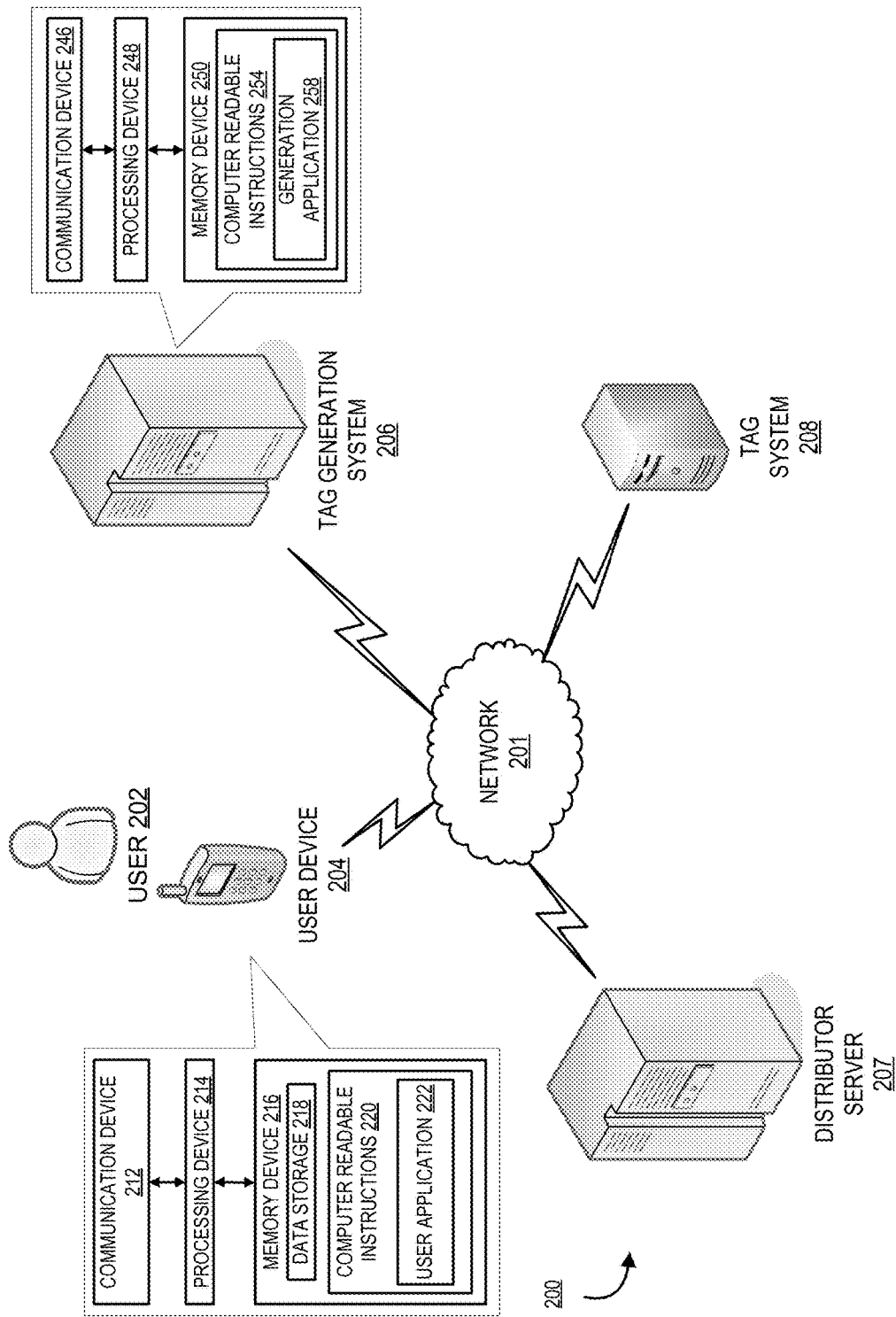
Figure 2:
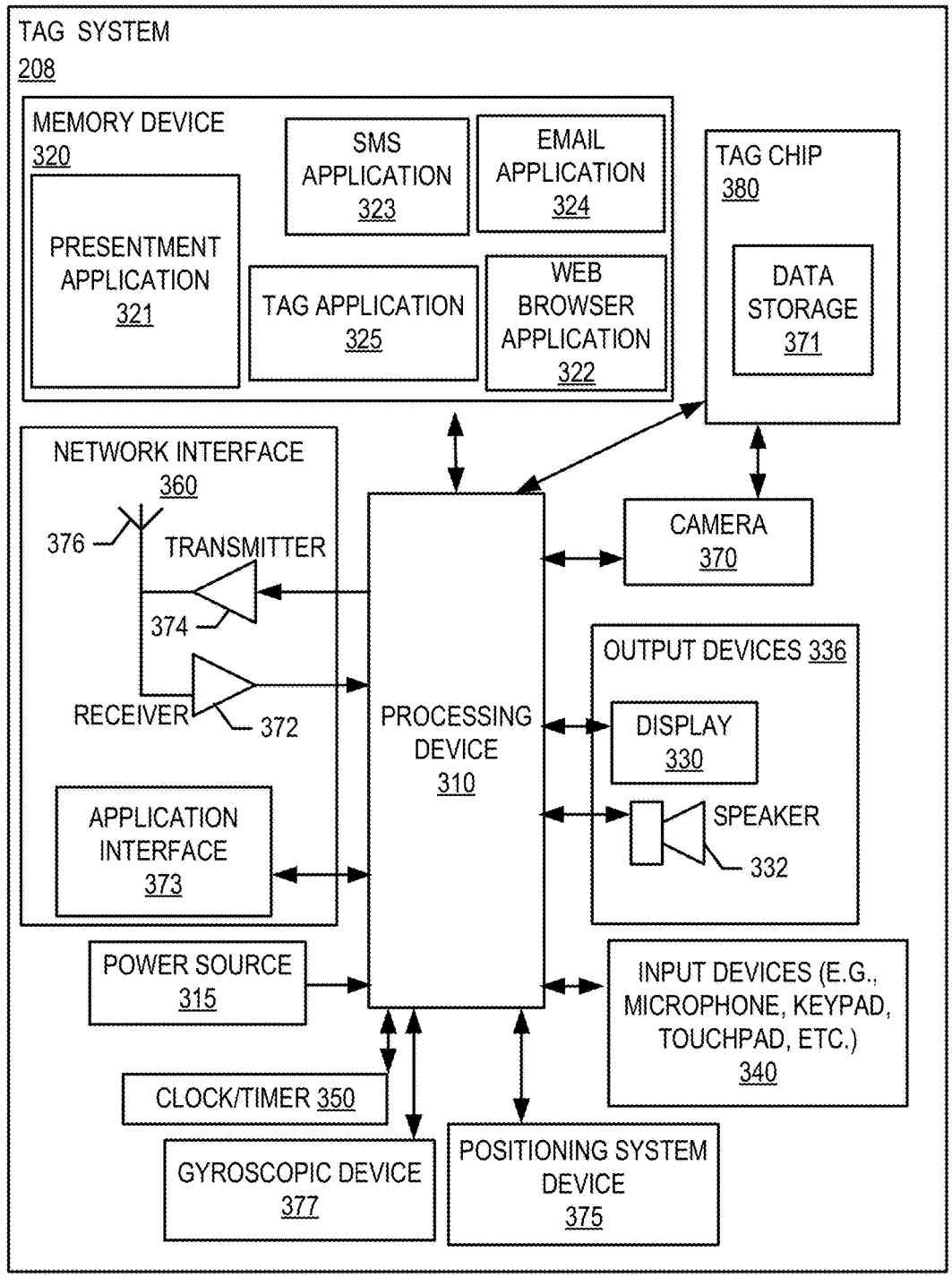
Figure 3:
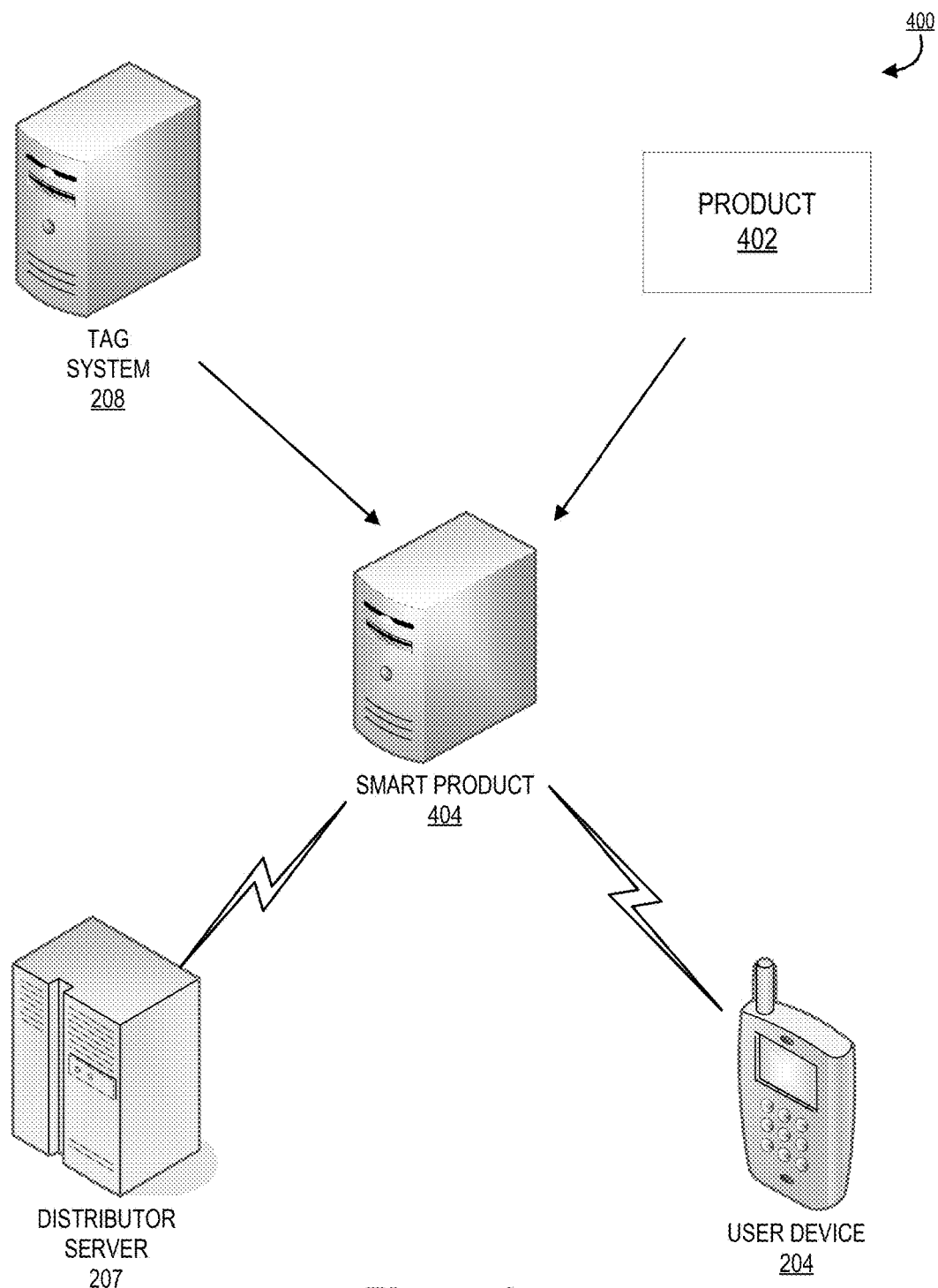
Figure 4:
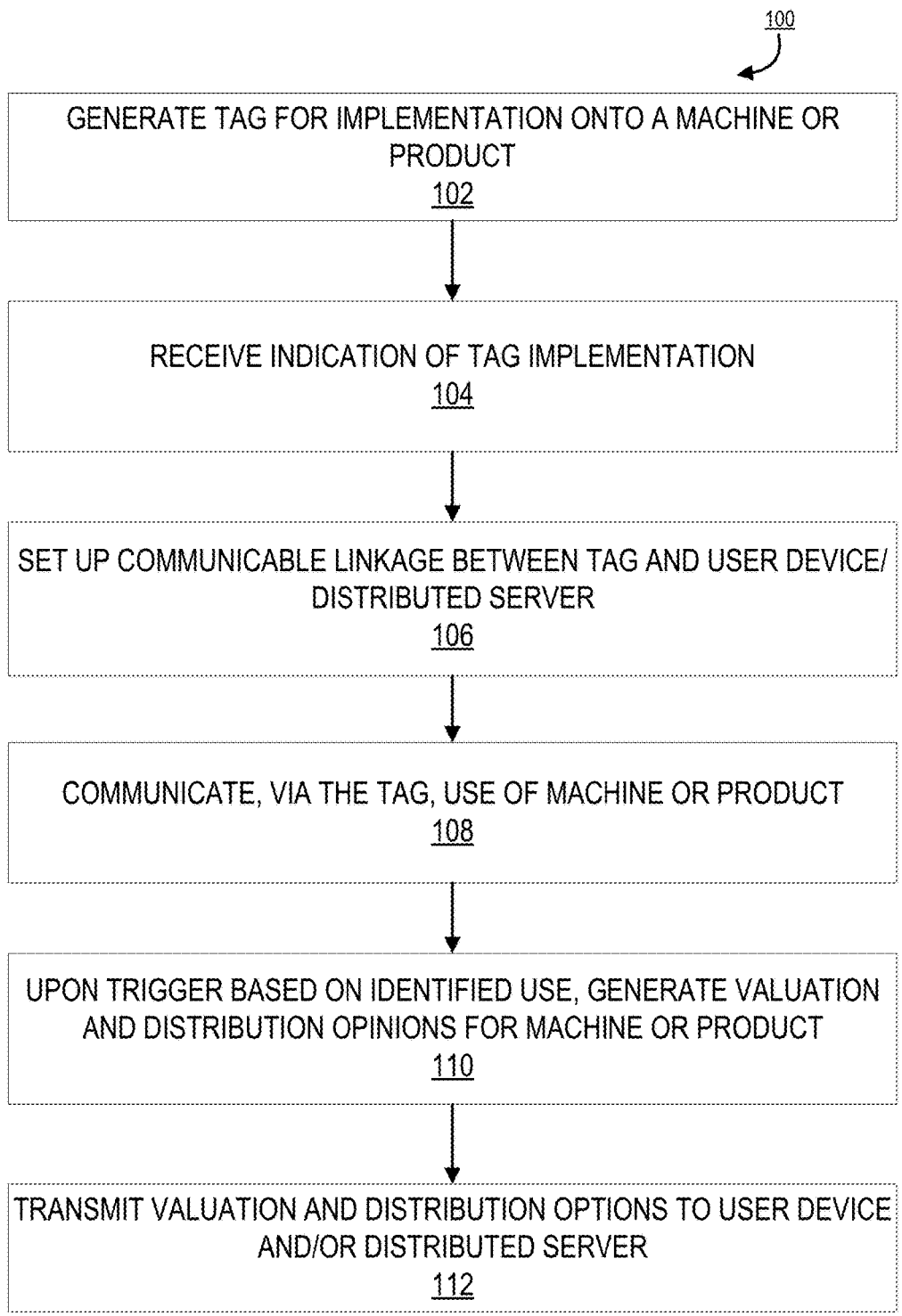
Figure 5:
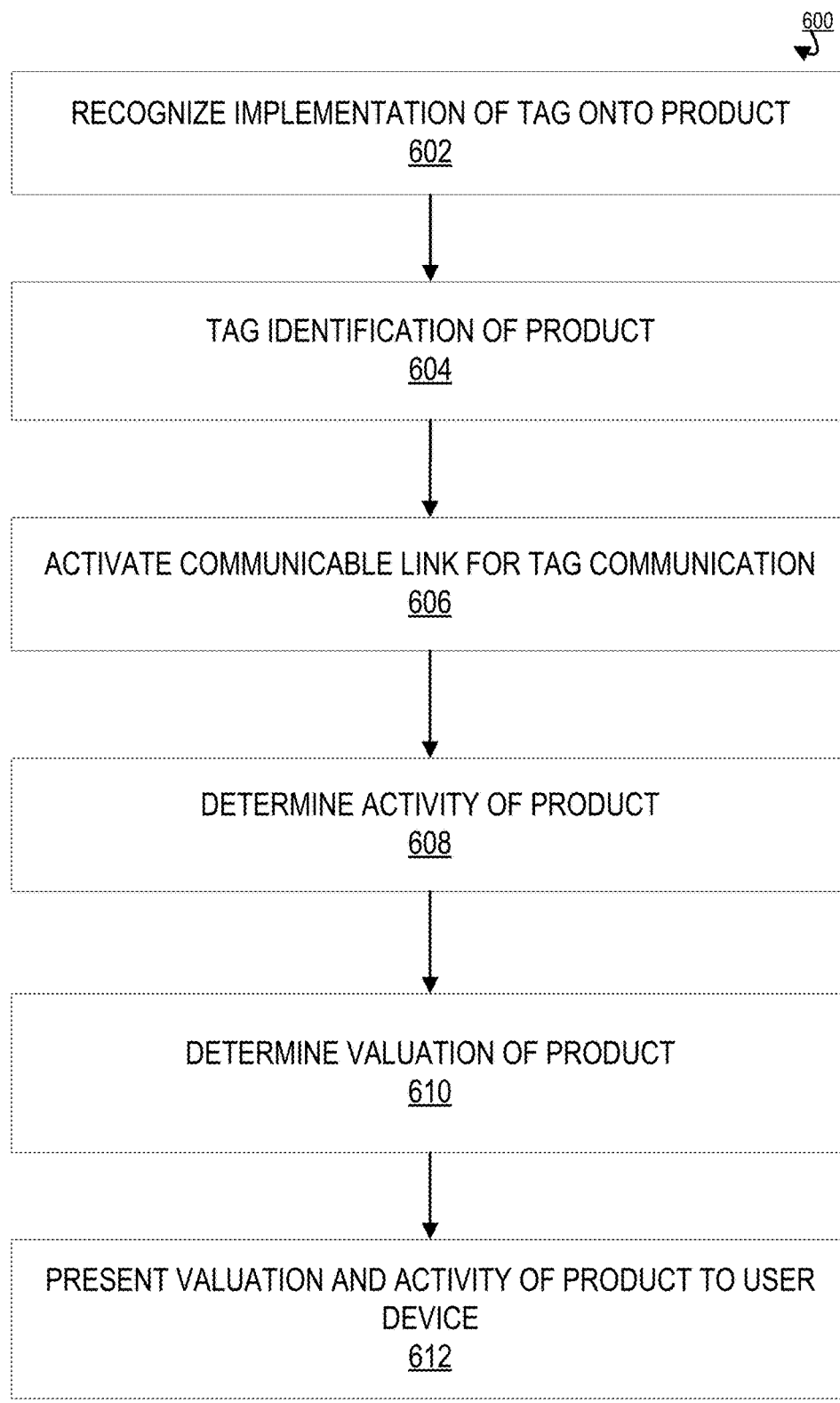
Figure 6:
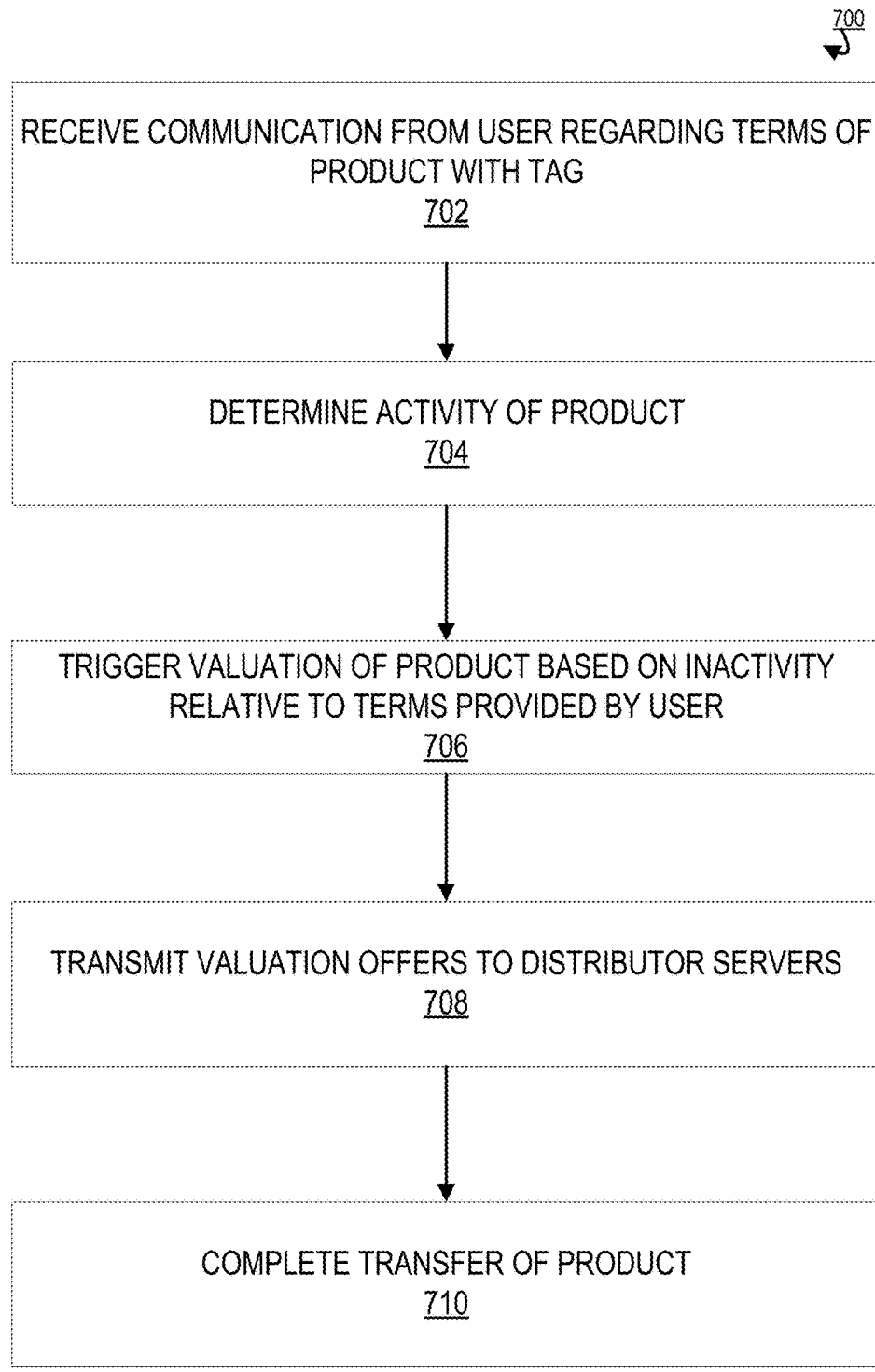
Figure 7:
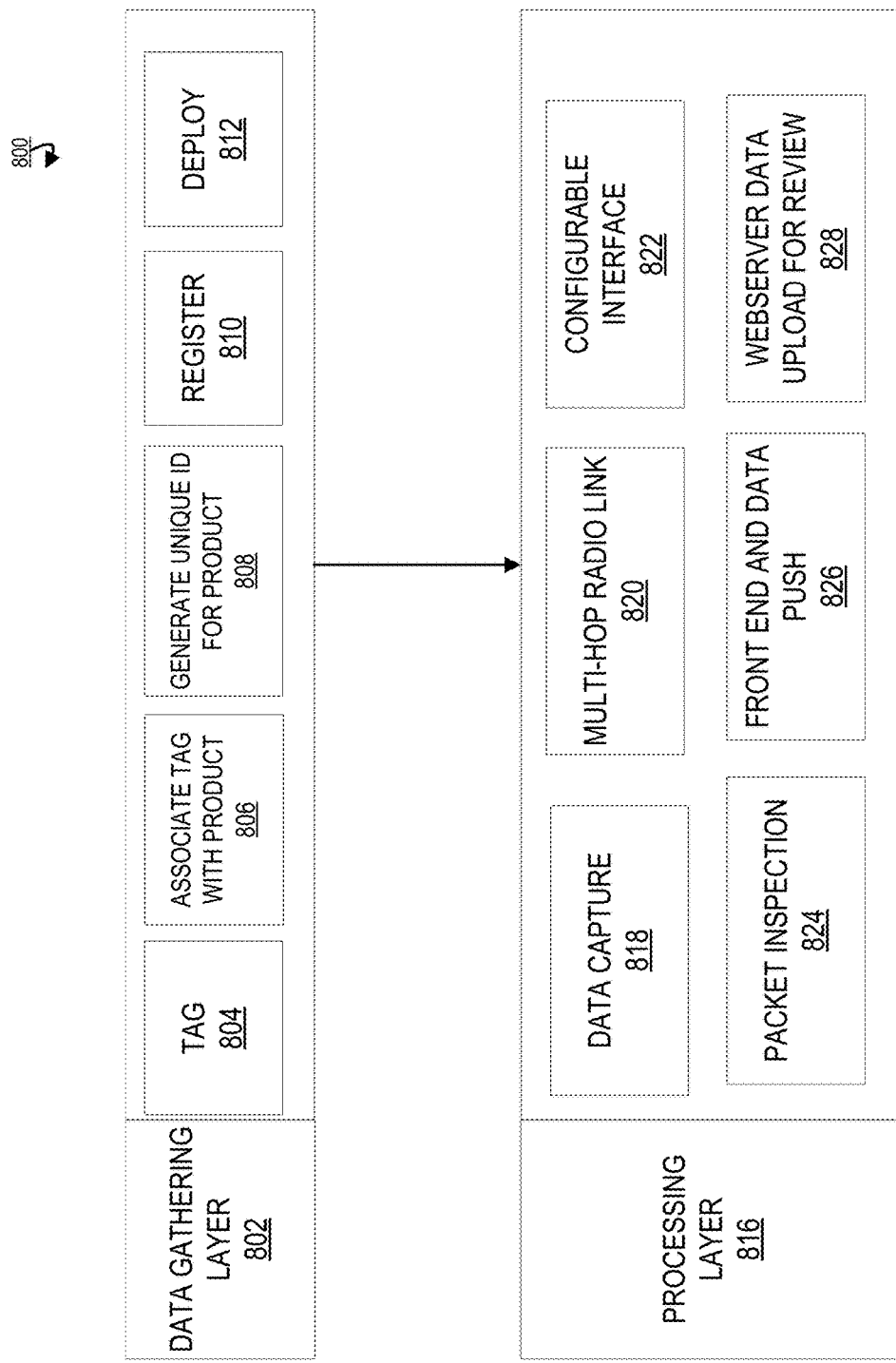

Having thus described embodiments of the invention in general terms, reference will now be made to the accompanying drawings, wherein:

FIG. 1 provides a tag generation and deployment system environment, in accordance with one embodiment of the present invention;

FIG. 2 provides a tag system environment, in accordance with one embodiment of the present invention;

FIG. 3 provides a tag implementation and communication system architecture environment, in accordance with one embodiment of the present invention;

FIG. 4 provides a high level process flow illustrating tag generation and deployment for product or machine valuation and distribution, in accordance with one embodiment of the present invention;

FIG. 5 provides a process map illustrating tag implementation and monitoring of product activity, in accordance with one embodiment of the present invention;

FIG. 6 provides a process map illustrating tag triggered valuation and distribution of a product, in accordance with one embodiment of the present invention; and FIG. 7 provides a process map illustrating tag generation and deployment for product or machine valuation and distribution, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to an individual owning, using, or operating a product or machine. In other embodiments, a user may be an entity owning or using a product or machine. For purposes of this invention, the term "user" and "user" may be used interchangeably.

Furthermore, as used herein the term "user device" or "mobile device" may refer to mobile phones, personal computing devices, tablet computers, wearable devices, and/or any portable electronic device capable of receiving and/or storing data therein.

A "product" as used herein includes a machine or device using or applying mechanical power and having several parts with define functions and perform a particular task. Furthermore, a product may a physical object such as a household item, furniture, electronic device, food products, or the like.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the system and tag may be associated with a network of physical objects such as products, buildings and other items embedded with network connectivity that allow for the objects to collect and exchange data. This exchange allows for objects to be sensed and monitored remotely for maintenance, predictive failures, updates or the like. In this way, creating opportunities for more direct integration of the physical world into computer-based systems, and resulting in improved efficiency, accuracy and economic benefit. When products are augmented with sensors and actuators, the technology allows products to be interoperate within the existing internet infrastructure.

Embodiments of the present invention address the above needs and/or achieve other advantages by providing apparatuses (e.g., a system, computer program product and/or other devices) and methods for product tag generation and deployment of product valuation and distribution. Embodiments of the invention are directed to a system, method, or computer program product for a distributive network system with specialized data feeds associated with the distributive network and specific triggering events associated with the data feeds for tag implementation and communication.

FIG. 1 illustrates a tag generation and deployment system environment 200, in accordance with one embodiment of the present invention. FIG. 1 provides the system environment 200 for which the distributive network system with specialized data feeds. FIG. 1 provides a unique system that includes specialized servers and system communicably linked across a distributive network of nodes required to perform the functions of tag generation, implementation, and function.

As illustrated in FIG. 1, the tag system 208 is operatively coupled, via a network 201 to the user device 204, and to the tag generation system 206. In this way, the tag system 208 can send information to and receive information from the user device 204, distributor servers 207, and the tag generation system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an owner or is using a product or machine. In other embodiments, the user 202 is an entity that owns or uses a product or machine. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the tag generation system 206, the tag system 208, and the distributor sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to receive communications from the tag system 208.

As further illustrated in FIG. 1, the tag generation system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the tag system 208, the distributor server 207, and the user device 204. As such, the communication device 246 generally comprises a modem, server, or other device for communicating with other devices on the network 201.

As further illustrated in FIG. 1, the tag generation system 206 comprises computer-readable instructions 254 stored in the memory device 250, which in one embodiment includes the computer-readable instructions 254 of a generation application 258. In some embodiments, the memory device 250 includes data storage 252 for storing data related to the system environment, but not limited to data created and/or used by the generation application 258.

In one embodiment of the tag generation system 206 the memory device 250 stores a generation application 258. In one embodiment of the invention, the generation application 258 may associate with applications having computer-executable program code that generate and code a tag for implementation onto a product. Furthermore, the tag generation system 206, using the processing device 248 codes the tag to perform certain communication functions involving described herein. In one embodiment, the computer-executable program code of an application associated with the generation application 258 may also instruct the processing device 248 to perform certain logic, data processing, and data storing functions of the application.

The processing device 248 is configured to use the communication device 246 to build and code the tag system 208 for implantation onto a product. In the embodiment illustrated in FIG. 1 and described throughout much of this specification, the generation application 258 may code the tag system 208 for implementation onto a product or machine. As such, the generation application 258 may provide the coding, software, and hardware to the tag system 208 and continue in communication with the tag system 208 after tag system 208 deployment for valuation and distribution of the product associated with the tag system 208.

As illustrated in FIG. 1, the distributor server 207 is connected to the tag system 208, user device 204, and tag generation system 206. The distributor server 207 has the same or similar components as described above with respect to the user device 204 and the tag generation system 206. While only one distributor server 207 is illustrated in FIG. 1, it is understood that multiple distributor servers 207 may make up the system environment 200. The distributor server 207 may be associated with one or more merchants, distributors, manufacturers, auction agencies, pricing agencies, or the like. As such, the tag system 208, tag generation system 206, and the user device 204 may communicate with the distributor such that a price for a product may be determined and a buyer for purchasing the product.

As illustrated in FIG. 1, the tag system 208 is connected to the distributor server 207, user device 204, and tag generation system 206. The tag system 208 is further detailed below with respect to FIG. 2. The tag system 208 has the same or similar components as described above with respect to the user device 204 and the tag generation system 206. While only one tag system 208 is illustrated in FIG. 1, it is understood that multiple tag system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a tag system environment that may be configured to deploy onto a product and provide product valuation and distribution. A "tag system" 208 may be any tag capable of being affixed to a product or a machine. The tag system 208 may generally include a processing device 310 communicably coupled to devices as a memory device 320, output devices 336, input devices 340, a network interface 360, a power source 315, a clock or other timer 350, a camera 370, a positioning system device 375, a gyroscopic device 377, one or more chips 380, and the like.

In some embodiments, the tag system 208 access one or more databases or datastores (not shown) to search for and/or retrieve information related to the product it is affixed thereto. In some embodiments, the tag system 208 access both a memory and/or datastore local to the tag system 208 as well as a datastore remote from the tag system 208.

The processing device 310 may include functionality to operate one or more software programs or applications, which may be stored in the memory device 320. For example, the processing device 310 may be capable of operating a connectivity program, such as a web browser application 322. The web browser application 322 may search for one or more valuations of the products the tag system 208 is affixed thereto. In this way, the web browser application 322 may search web sites, such as auction sites, bidding sites, or the like that may provide an indication of the value of one or more of the products that the tag system 208 is affixed to. In this way, the tag system 208 may transmit and receive web content, such as, for example, product valuation, location-based content, and/or other web page content, according to a Wireless Application Protocol (WAP), Hypertext Transfer Protocol (HTTP), and/or the like.

The processing device 310 may also be capable of operating applications, such as a tag application 325 and/or a presentment application 321. The tag application 325 and/or presentment application 321 may be downloaded from a server and stored in the memory device 320 of the tag system 208. Alternatively, the tag application 325 and/or presentment application 321 may be pre-installed and stored in a memory in the tag chip 380.

In such an embodiment, the tag system 208 may previously store the tag application 325 and/or presentment application 321 prior to affixing the tag system 208 to the product. In this way the tag application 325 and/or presentment application 321 may remain and be stored on the tag system 208 when affixed to a product or machine.

The tag application 325 provides the tag system 208 with product recognition capabilities and valuation of the product with the tag system 208 attached thereto. In this way, products, machines, and/or the like may be recognized by the tag application 325. As such, the tag application 325 may determine the product or machine that the tag system 208 is affixed thereto. The tag application 325 may determine the product or machine based on an identification of the shape, size, weight, user input of the product, or the like. In this way the tag application 325 may communicate with other devices on the network 201 to determine the product associated or that the tag system 208 is affixed thereto.

The presentment application 321 provides the tag system 208 with communication to the user device or the like to present information associated with the product. In this way, the presentment application 321 may provide information about the product, including valuation and distribution abilities for the product. The presentment application 321 may communicate with the other devices on the network 201 to provide the valuation and stagnate and/or activity of the product to the user 202 via a real-time display. The presentation of activation of the product may be provided to the user 202 via presentment application 321.

The tag chip 380 may include the necessary circuitry to provide product recognition and functionality to the tag system 208. Generally, the tag chip 380 will include data storage 371 which may include data associated with the products that the tag system 208 affixed to the products. The tag chip 380 and/or data storage 371 may be an integrated circuit, a microprocessor, a system-on-a-chip, a microcontroller, or the like. In this way, the tag chip 308 will included data storage 371 which may include data associated with the presentment application 321.

Of note, while FIG. 2 illustrates the tag chip 380 as a separate and distinct element within the tag system 208, it will be apparent to those skilled in the art that the tag chip 380 functionality may be incorporated within other elements in the tag system 208. For instance, the functionality of the tag chip 380 may be incorporated within the memory device 320 and/or the processing device 310. In a particular embodiment, the functionality of the tag chip 380 is incorporated in an element within the tag system 208 that provide product recognition, product activity, product valuation, and the like to the tag system 208. Still further, the tag chip 380 functionality may be included in a removable storage device such as an SD card or the like.

The processing device 310 may be configured to use the network interface 360 to communicate with one or more other devices on a network 201. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the tag system 208 may be configured to operate with one or more air interface standards, communication protocols, modulation types, and access types. By way of illustration, the tag system 208 may be configured to operate in accordance with any of a number of first, second, third, and/or fourth-generation communication protocols and/or the like. For example, the tag system 208 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The tag system 208 may also be configured to operate in accordance with non-cellular communication mechanisms, such as via a wireless local area network (WLAN) or other communication/data networks.

The network interface 360 may also include an application interface 373 in order to allow a user 202 to execute some or all of the above-described processes with respect to the presentment application 321 and/or the tag chip 380. The application interface 373 may have access to the hardware, e.g., the transceiver, and software previously described with respect to the network interface 360. Furthermore, the application interface 373 may have the ability to connect to and communicate with an external data storage on a separate system within the network 201.

The tag system 208 may have an interface that includes user output devices 336 and/or input devices 340. The output devices 336 may include a display 330 (e.g., a liquid crystal display (LCD) or the like) and a speaker 332 or other audio device, which are operatively coupled to the processing device 310. The input devices 340, which may allow the tag system 208 to receive data from a user 202, may include any of a number of devices allowing the tag system 208 to receive data from a user 202, such as a keypad, keyboard, touch-screen, touchpad, microphone, mouse, joystick, other pointer device, button, soft key, and/or other input device(s).

The tag system 208 may further include a power source 315. Generally, the power source 315 is a device that supplies electrical energy to an electrical load. In some embodiment, power source 315 may convert a form of energy such as solar energy, chemical energy, mechanical energy, or the like to electrical energy. Generally, the power source 315 in a tag system 208 may be a battery, such as a lithium battery, a nickel-metal hydride battery, or the like, that is used for powering various circuits, e.g., the transceiver circuit, and other devices that are used to operate the mobile device 204. Alternatively, the power source 315 may be a power adapter that can connect a power supply from a power outlet to the tag system 208. In such embodiments, a power adapter may be classified as a power source "in" the tag system 208.

The tag system 208 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the tag system 208 described herein. For example, the memory device 320 may include such applications as a presentment application 321, recognition application 325, a web browser application 322, an SMS application 323, an email application 324, or the like.

As illustrated, the tag system 208 further comprises a gyroscopic device 377. The positioning system 375, input device 340, and the gyroscopic device 377 may be used in correlation to identify the product the tag system 208 is affixed to and the activity of the product. As such, the tag system 208 once affixed to a product may initially identify the product. Using the positioning system 375 and the input device 340, the system may identify the product. In some embodiments, the tag system 208 may identify the shape of a product and communicate the shape via the network 201 to distributor servers 207 to identify the product by the shape. In some embodiments, the tag system 208 may have a camera 370 that may identify a product brand, serial number, or the like. In other embodiments, the user 202 may input via the input device, information about the product. Finally, the user 202 may input on the user device 204 the product information that may be communicated to the tag system 208 via the network 201.

In some embodiments, the tag system 208 may identify the activity or use of the product. The tag system 208 may do this via the gyroscopic device 377, positioning system device 375, camera 370, and the like. As such, the tag system 208 may identify when the product is being used, how often it is being used, and the like. Furthermore, the tag system 208 may identify when maintenance may be required based on an identification of the product and regular maintenance required for that product to be maintained.

FIG. 3 illustrates a tag implementation and communication system architecture environment 400, in accordance with one embodiment of the present invention. As illustrated, the tag system 208 may be implemented with a product 402 to generate a product 402 with a tag system 208. In some embodiments, the tag system 208 may be affixed or otherwise physically placed onto the product 402. In some embodiments, the tag system 208 may be activated on a product 402 already comprising an internal software code that may accept the tag system 208 coding.

In some embodiments, the addition of the tag system 208 may generate a smart device or smart product 404. A "smart product" as used herein means a product, machine, and/or the like that is associated with a tag system 208 that is capable of communicating with and transmitting information or data to and/or receiving information or data from other devices, systems or apparatuses including over the network 201. FIG. 3 illustrates an exemplary embodiment of a smart product 404. A smart device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device may be any device that includes a communication interface or module, software and/or hardware that allow the device to communicate data and/or information related to the device with other devices and/or systems over network. In some embodiments, the tag system 208 may be affixed or associated with the product 402 in order to create a smart product 404 that may be similar to a smart device described here above.

One exemplary embodiment of a smart device may generally include, but is not limited to, a network communication interface, a processing device, and a memory device such as described herein. The processing device is operatively coupled to the network communication interface and the memory device. The smart device may also have a control system for controlling the physical operation of the device. The control system may comprise one or more sensors for detecting operating conditions of the various mechanical and electrical systems that comprise the smart device or of the environment in which the smart device is used. The sensors may communicate with the processing device to provide feedback to the operating systems of the device. The control system may also comprise metering devices for measuring performance characteristics of the smart device. The control system may also comprise controllers such as programmable logic controllers (PLC), proportional integral derivative controllers (PID) or other machine controllers. The smart device may also comprise various electrical, mechanical, hydraulic or other systems that perform various functions of the smart device. These systems may comprise, for example, electrical circuits, motors, compressors, or any system that enables functioning of the smart device.

In one embodiment, applications having computer-executable program code that instruct the processing device to operate the various systems of the smart device including network communication interface to perform certain communication functions and to perform certain logic, data processing, and data storing functions of the application as described herein are stored in memory device.

The smart device may also include a resource distribution communication interface device that allows the smart device to be connected to and to communicate with a resource distribution device. The communication interface device may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart device may also include a communication interface device that may be connected by a hardwire connection to the resource distribution device. The interface device may comprise a connector such as a USB, SATA, PATA, SAS or other data connector for transmitting data to and from the smart device. In some embodiments the smart device may comprise a port or plug that is compatible with a mating port or plug on the resource distribution interface device. In some embodiments the network communication interface may function as both the network interface device and the resource distribution device communication interface.

As illustrated, the smart product 404 may comprise one or more of the applications and processors associated with the smart device. The smart product 404 may communicate directly with the distributor servers 207 and the user device 204. As such, the smart product 404 may communicate with the distributor server 207 to provide the smart product 404 with one or more valuations of the product, to sell or distribute products that have been triggered for sale.

In some embodiments, the smart product 404 may communicate with the user device 204. As such the smart product 404 may communicate activity of the product to the user and/or the tag generation system. Furthermore, the user via the user device 204 may communicate product sale triggers and/or distribution requirements for the product.

FIG. 4 illustrates a high level process flow illustrating tag generation and deployment for product or machine valuation and distribution 100, in accordance with one embodiment of the present invention. As illustrated in block 102, the process is initiated by generating the tag for implementation into a machine or product. As described above, the tag may be generated with one or more devices such as a processing device, memory device, and/or communication device. In this way, the tag is generated for communicating with a user, distributor, or the like for the product valuation and distribution.

Once the tag has been generated, it may be positioned onto a machine or product. In some embodiments, the tag may be physically attached or affixed via mounting means, such as adhesive, screws, or the like to the product. In other embodiments, the tag may be activated on a product already comprising the software capable of running the tag. Once implementation of the tag has been completed, the tag may be activated for transmission. As such, as illustrated in block 106, the process 100 continue by setting up a communicable linkage between the tag and the user device as well as the distributed server. Furthermore, the tag may be in communication with the tag generation system for maintenance, updates, and/or the like.

Next, as illustrated in block 108, the process 100 continues such that the tag may communicate the use of the machine or product. As such, the tag may have one or more sensors, such as gyroscopic sensors or the like that may indicate the movement of the product. The movement of the product may translate to the amount of use of the product. Furthermore, other sensors such as sensors associated with diminishing fuels, filters, or the like associated with the machine or product. The use of the tag may consist of movement of the product, running of the product, wearing of the product, or the like. In this way, the tag recognizes one or more uses of the product and may communicate the use of the product.

As illustrated in block 110, the process 100 continues by generating valuation and distribution opinions for a machine or product, based on a triggering event occurring associated with the identified use. In some embodiments, the valuation opinions may comprise one or more amounts or resources that are willing to be tendered in exchange for the product. In some embodiments, the distribution options may comprise one or more individuals, companies, or the like willing to purchase the product.

Finally, as illustrated in block 112, the process 100 ends by transmitting the valuation and distribution options to the user device and/or distributed server. As such, the user or distributer may be provided via a display screen one or more options for valuation of the product and/or distribution options for providing a value and a distribution channel for the product.

FIG. 5 illustrates a process map illustrating tag implementation and monitoring of product activity 600, in accordance with one embodiment of the present invention. As illustrated in block 602, the process 600 is initiated by recognizing the implementation of the tag onto the product. Recognition of the implementation may be based on a power up of the tag system affixed to and/or associated with the product. Once the tag has been implemented on the product or the tag coding has been initiated on the product, the process continues by identifying the product, as illustrated in block 604. The tag may identify the product by identifying the shape or size of the product, receiving user input of the product type, receiving product stock numbers, or the like. Furthermore, the tag may identify the product based on GPS signal from the tag. Once a shape, size, stock number, product type or the like is identified, the tag may communicate to one or more distributors to aid in indemnification of the specific product the tag is now affixed thereto.

As illustrated in block 606, the process 600 continues by activating a communicable link for the tag to communicate with the user device and/or distributor servers. The communicable linkage allows for the tag to communicate valuation and distribution options to the user. Furthermore, the communicable linkage allows the tag to receive information from systems in order to identify the product and valuations for sources for the same.

As illustrated in block 608, once the tag has identified the product and the communicable linkage has been activated, the system may determine the activity of the product of which the tag is affixed. Using devices associated with the tag, such as the gyroscopic device, positioning device, camera, or the like. In this way, the motion of the product, activation of the product, powering on or off of the product, or the like. As such, the system identifies and tallies the use of the product and a duration of time associated with that use.

In some embodiments, the tag may then determine a valuation of the product, as illustrated in block 610. In this way, the tag may reach out to a merchant or the like, such as a distributor server with details about the product, use of the product, age of the product, and the like, in order to ascertain a potential value of the product. The tag may provide all of the information about the product associated with the tag and provide that information to an outside source to determine a valuation of the product.

Finally, as illustrated in block 612, the process 600 is finalized by presenting a valuation and activity of the product to the user device. As such, the tag may present, via a user interface, a valuation or price of the product and a distributor willing to purchase the product for that price. In some embodiments, the system may also present the user with the activity log of the product. In this way, the tag may present the duration of use, amount of use, number of times used, and the like. As such, the tag may present the user with a log of the activity of the product.

FIG. 6 illustrates a process map for tag triggered valuation and distribution of a product 700, in accordance with one embodiment of the present invention. As illustrated in block 702, the process 700 is initiated by receiving communications from the user regarding terms of the product with the tag. In this way, in some embodiments, the user may provide, via an input device on the user system, the tag with information about the terms of the product, such as the product name, brand, type, serial number, or the like. Furthermore, the terms of the product may include one or more durations of inactivity that the user desires to trigger a sale or distribution of the product. As such, the user may determine that if the product has not been active for a duration of time, such as one week or the like, the user may set a term of one week. Once the tag identifies that a week has passed without activity logged for the product, the tag may request a valuation of the product and trigger the product for distribution.

Next, as illustrated in block 704, the process 700 continues by determining the activity of the product associated with the tag. As such, the tag may log one or more movements of the product, uses of the product, activations of the product, or the like. Once the activity is logged and stored by the tag, the process 700 continues by determining a valuation of the product based on an inactivity trigger related to the terms of the product provided by the user. As such, the tag may reach out to one or more valuation entities specializing in valuation of the product to and provide the entity with the information about the product. Subsequently, the tag may receive a valuation or current value for the product.

Next, as illustrated in block 708, the tag may transmit the valuation to distributors in the form of an offer to sell the product for the determined valuation. As such, the tag may reach out to one or more vendors, merchants, online auction houses, or the like in order to determine if one or more of the entities may be interested in purchasing the product at the valuation price.

Finally, as illustrated in block 710, the process 700 is completed by the tag completing the transaction for distribution of the product. The distribution may be confirmed by the user at this stage or the user may have inputted a term that triggers a distribution automatically based on the valuation of the product and the inactivity.

Furthermore, in some embodiments, the product may be presented for trade between one or more parties that have products the user may be interested in. The system may recognize a usage amount for both products for trade comparison. Furthermore, usage may be identified for renting the product out to other individuals, such as renting out vehicles, tools, or the like.

FIG. 7 provides a process map illustrating tag generation and deployment for product or machine valuation and distribution 800, in accordance with one embodiment of the present invention. As illustrated, the data gathering layer 802 of the process 800 includes a generated tag 804, associating the tag with a product 806, generating a unique identification for the product with the tag 808, registering the identification 810, and allowing for deployment of data associated with the tagged product 812. Furthermore, the processing layer 816 of the process 800 comprises capturing data from the tag 818, providing a multi-hop radio link 820, generating a configurable interface 822, inspection of the packets for display in the interface 824, front end and data pushing to the interface 826, and webserver data upload for review by the user or third party 828.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a deployable valuation and distribution tag, the system comprising:
   a memory device with computer-readable program code stored thereon;
   a communication device;
   a processing device operatively coupled to the memory device and the communication device, wherein the processing device is configured to execute the computer-readable program code to:
      receive an indication of deployment onto a product, wherein the indication of deployment comprises an activation of the tag;
      identify the product deployed onto;
      generate a communicable linkage with distributor servers;
      identify, during deployment, activity associated with the product and log the activity identified;
      receive terms from a user, wherein the terms define a trigger duration of inactivity;
      monitor, during deployment of the tag, inactivity of the product and log the inactivity identified;
      trigger valuation and distribution of product based on an identification of the duration of inactivity associated with the terms from the user;
      confirm valuation and distribution terms are acceptable by user based on received terms from the user; and
      complete a distribution of the product to the valuation entity.

2. The system of claim 1, further comprising generating the tag, wherein the tag is an affixable device comprising a communication linkage generator, positioning device, and gyroscopic device.

3. The system of claim 1, wherein identifying activity associated with the product further comprises using a gyroscopic device and positioning device associated with the tag to monitor motion and activation of the product.

4. The system of claim 1, wherein identifying a shape of the product further comprises scanning the product using a camera or sensor associated with the tag to identify a shape of the product and communicating the shape to the user device and distributor servers for confirmation of identification of product.

5. The system of claim 1, wherein distributor servers are associated with a merchant, online auction house, or manufacturer capable of valuation and purchasing of the product based on receiving the product information from the tag.

6. The system of claim 1, further comprising distributing the product to a purchaser based on user selection and approval of the distribution value, wherein distribution further comprises transferring of warranty to the purchaser.

7. The system of claim 1, wherein the product is a machine.

8. A computer program product for a deployable valuation and distribution tag, the computer program product comprising at least one non-transitory computer-readable medium having computer-readable program code portions embodied therein, the computer-readable program code portions comprising:
   an executable portion configured for receiving an indication of deployment onto a product, wherein the indication of deployment comprises an activation of the tag;
   an executable portion configured for identifying the product deployed onto;
   an executable portion configured for generating a communicable linkage with distributor servers;
   an executable portion configured for identifying, during deployment, activity associated with the product and log the activity identified;
   an executable portion configured for receiving terms from a user, wherein the terms define a trigger duration of inactivity;
   an executable portion configured for monitoring, during deployment of the tag, inactivity of the product and log the inactivity identified;
   an executable portion configured for triggering valuation and distribution of product based on an identification of the duration of inactivity associated with the terms from the user;
   an executable portion configured for confirming valuation and distribution terms are acceptable by user based on received terms from the user; and
   an executable portion configured for completing a distribution of the product to the valuation entity.

9. The computer program product of claim 8, further comprising an executable portion configured for generating the tag, wherein the tag is an affixable device comprising a communication linkage generator, positioning device, and gyroscopic device.

10. The computer program product of claim 8, wherein identifying activity associated with the product further comprises using a gyroscopic device and positioning device associated with the tag to monitor motion and activation of the product.

11. The computer program product of claim 8, wherein identifying a shape of the product further comprises scanning the product using a camera or sensor associated with the tag to identify a shape of the product and communicating the shape to the user device and distributor servers for confirmation of identification of product.

12. The computer program product of claim 8, wherein distributor servers are associated with a merchant, online auction house, or manufacturer capable of valuation and purchasing of the product based on receiving the product information from the tag.

13. The computer program product of claim 8, further comprising an executable portion configured for distributing the product to a purchaser based on user selection and approval of the distribution value, wherein distribution further comprises transferring of warranty to the purchaser.

14. A computer-implemented method for a deployable valuation and distribution tag, the method comprising:
  providing a computing system comprising a computer processing device and a non-transitory computer readable medium, where the computer readable medium comprises configured computer program instruction code, such that when said instruction code is operated by said computer processing device, said computer processing device performs the following operations:
  receiving an indication of deployment onto a product, wherein the indication of deployment comprises an activation of the tag;
  identifying the product deployed onto;
  generating a communicable linkage with distributor servers;
  identifying, during deployment, activity associated with the product and log the activity identified;
  receiving terms from a user, wherein the terms define a trigger duration of inactivity;
  monitoring, during deployment of the tag, inactivity of the product and log the inactivity identified;
  triggering valuation and distribution of product based on an identification of the duration of inactivity associated with the terms from the user;
  confirming valuation and distribution terms are acceptable by user based on received terms from the user; and
  completing a distribution of the product to the valuation entity.

15. The computer-implemented method of claim 14, further comprising generating the tag, wherein the tag is an affixable device comprising a communication linkage generator, positioning device, and gyroscopic device.

16. The computer-implemented method of claim 14, wherein identifying activity associated with the product further comprises using a gyroscopic device and positioning device associated with the tag to monitor motion and activation of the product.

17. The computer-implemented method of claim 14, further comprising distributing the product to a purchaser based on user selection and approval of the distribution value, wherein distribution further comprises transferring of warranty to the purchaser.

\* \* \* \* \*